July 8, 1947.　　　　G. M. HORVITCH　　　　2,423,649
ELECTRIC BURGLAR ALARM
Filed June 14, 1945

Gerard Michael Horvitch
His Attorney

Patented July 8, 1947

2,423,649

UNITED STATES PATENT OFFICE 2,423,649

ELECTRIC BURGLAR ALARM

Gerard Michael Horvitch, Johannesburg, Transvaal, Union of South Africa

Application June 14, 1945, Serial No. 599,327
In the Union of South Africa December 8, 1944

3 Claims. (Cl. 177—314)

This invention relates to electric burglar-alarms, and its object is to provide an alarm of this kind which will be simple to make, easy and inexpensive to instal, and reliable in use, and which can be applied to a house, shop, building or the like in such a manner that the individual door, window or the like at which a burglar makes, or attempts to make, an entry can be at once detected.

According to the invention, I provide an electric burglar-alarm in which at each of the respective doors, windows or like points of possible entry to a building which it is desired to protect, a separate electrical resistance (hereinafter called a detector resistance) is provided, together with, in respect of each such detector resistance, a shunt resistance connected in parallel therewith, and in which the detector and shunt resistances are connected in circuit with a battery or other source of electric current and with a meter or like instrument having a pointer or moving element; said pointer or moving element being associated, on the one hand, with a chart or scale calibrated to show the respective points of possible entry at positions within the range of the pointer or moving element corresponding to the magnitude of the respective pairs of detector and shunt resistances and, on the other hand, with a fixed contact member, or members, which is, or are, connected with an alarm bell, buzzer or other signal circuit.

The arrangement of each detector resistance and its corresponding shunt resistance is such that when the point of entry associated therewith is forced open, the detector resistance (and also its shunt resistance by virtue of its being connected in parallel) is shorted out.

The fixed contact member, or members, is, or are, so situated in relation to the normal position of the pointer or moving element that said element will make contact with the fixed contact member, or members, and close the signal circuit whenever a predetermined limit of deviation of the moving element is exceeded, as, for example, when one of the detector resistances is shorted out, or one of the shunt resistances broken, or when the resistance circuit as a whole is severed or interrupted.

Preferably, my burglar alarm is provided, in the resistance circuit thereof, with a balancing rheostat or other means for compensating for drop in voltage of the battery or equivalent or otherwise keeping the operation of the instrument true in relation to the chart or scale.

As a further feature of the invention, each detector resistance is associated with switch means, operable by the door, window or like point of possible entry with which the detector resistance is coupled, the arrangement being such that once the point of entry has been forced open, the switch means associated therewith is locked on and held on (notwithstanding that the point of entry may be subsequently closed) to short out the detector resistance and keep it so shorted out. Key means may be provided for resetting said switch means when required.

Locking means may be provided on the alarm bell, buzzer or equivalent in order to keep it in operation once it has been set off.

In order that the invention and the manner in which it is to be performed may be more readily understood, a preferred embodiment will now be described by way of example with reference to the accompanying drawings in which—

Figure 1:
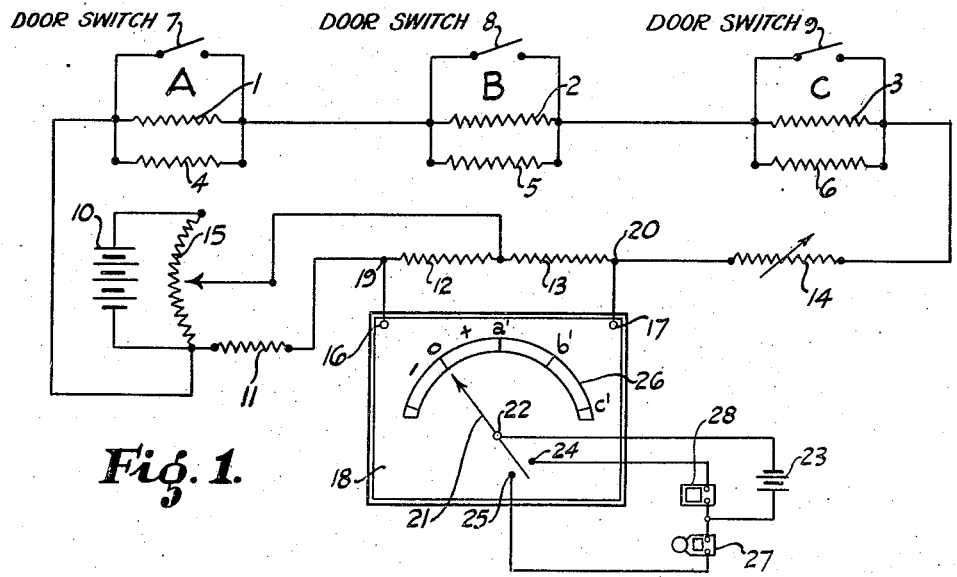
Fig. 1 is a circuit diagram of a burglar-alarm according to the invention, applicable to a building having three possible points of entry.

Referring to Fig. 1, detector resistances 1, 2, 3, having shunt resistances 4, 5, 6, in parallel therewith, are positioned respectively at the three points of entry designated generally by A, B, and C. Switches 7, 8, 9 (hereinafter described in detail with reference to Figs. 2, 3, and 4) are connected across the detector resistances 1, 2, 3. The detector resistances 1, 2, 3 are connected in series with a battery 10, balancing resistances 11, 12, 13 for balancing the current in the circuit, and a precision variable resistance 14 which is permanently set according to the number of points of entry for which the circuit has been designed, being included in the circuit. A balancing rheostat 15 to compensate for voltage drop is shunted across the battery 10. The terminals 16, 17 of a sensitive ammeter 18 are connected to the resistance circuit at points 19, 20. The pointer 21 of the ammeter 18 has its pivot 22 connected to a battery 23 and spring contact members 24, 25, which are so constructed as not to impede the movement of the pointer 21 up to the extremities of the scale 26 (which is graduated at $a'$, $b'$, and $c'$ to correspond with the respective points of entry A, B and C) are connected in circuit with an alarm bell 27 and a buzzer 28, which circuit is also connected to the battery 23. The pointer 21 is shown in its zero position on the scale 26.

Figures 2, 4:
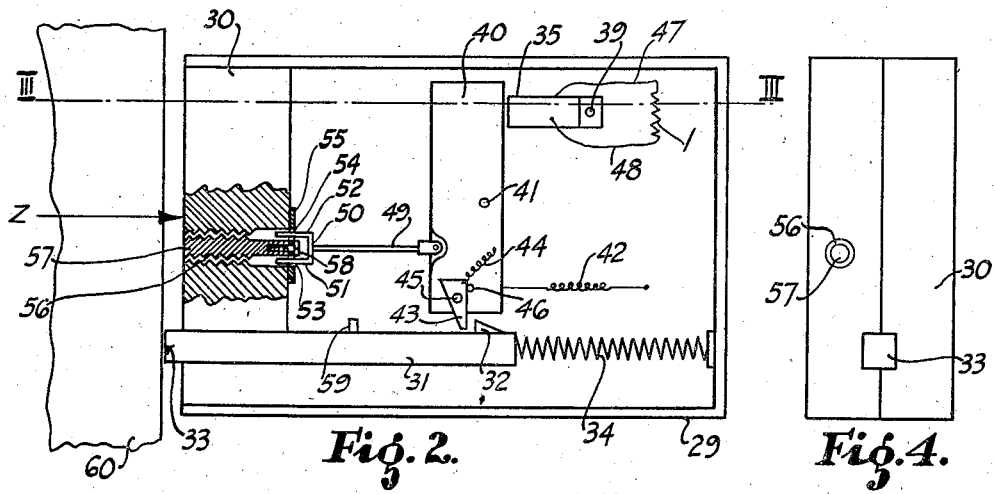
Fig. 2 is an elevation (partly cut away) of one of the switch boxes with the cover removed.
Fig. 4 is an end elevation of the switch box shown in Fig. 2 looking in the direction of the arrow "Z."
Figure 3:
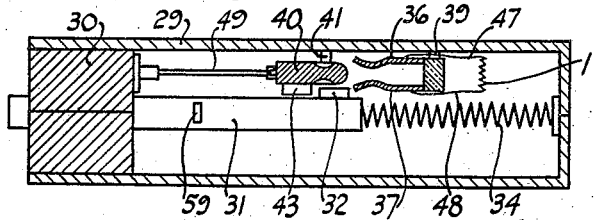
Fig. 3 shows a section on the line III—III in Fig. 2.

Referring now to Figs. 2, 3 and 4, which illustrate the switch 7 shown in Fig. 1 (switches 8 and 9 are identical), the switch mechanism is contained within a box 29 the end 30 of which is solid and the remainder hollow. A plunger 31 having a projecting wedge-shaped lug 32 and a stop 59 formed thereon is depressible at its end 33 by a door or window 60 against the action of a coiled spring 34. A contact piece 35, formed of two spring metal jaws 36, 37, separated by an insulator 38 (see Fig. 3) is fixed to the box 29 by a pin 39. A contact arm 40, pivoted at 41, is normally held away from the jaws 36, 37, by a spring 42. Associated with the contact arm 40 is a lug 43, spring loaded at 44 and pivoted at 45. A stop 46 restricts the movement of the lug 43. The jaws 36, 37 are connected by wires 47, 48 across the detector resistance 1. Attached to the contact arm 40 at a point below the pivot 41 is a rod 49 the other end of which is fastened to a bridge piece 50 having two arms 51, 52, which project through holes 53, 54 in a plate 55 affixed to the solid end 30 of the box 29. A threaded annulus 56 is provided in the solid end 30 of the box 29 and a block 57 is fastened to the plate 55 by a screw 58. The arrangement is such that when a threaded key is screwed into the annulus 56 it will eventually come in contact with the arms 51, 52 of the bridge piece 50.

The detector and shunt resistances may be of any suitable magnitude. In the example shown in the drawings, the detector resistances 1, 2 and 3 may be 1, 2, and 3 ohms respectively and the corresponding shunt resistances 4, 5, 6 may likewise be 1, 2 and 3 ohms respectively. Thus, if the first point of entry A is forced open and detector resistance 1 is shorted out, the total decrease in resistance of the circuit will be ½ ohm. Likewise if the second point of entry B is opened and the detector resistance 2 shorted out, the total decrease will be 1 ohm. Again, if the detector resistance 3 is shorted out, the decrease will be 1½ ohms. When any one of the detector resistances 1, 2, 3 is shorted out, a displacement of current in the circuit will be caused equivalent to a marking on the ammeter scale 26 corresponding to the point of entry with which that detector resistance is associated.

The operation of the burglar-alarm is as follows:

If the detector resistance circuit is cut or interrupted, the current passing through the ammeter 18 will become negatively polarised and this will cause the pointer 21 to move to the negative side of zero on the scale 26. In doing so, the pointer 21 will touch the contact member 24 closing the circuit of the buzzer 28 which is provided with locking means whereby it is kept in operation once it has been set off.

If, on the other hand, the circuit is not cut but a point of entry (e. g., is a window) is opened, the spring 34, which is normally kept compressed by the pressure of the window frame on the end 33 of the plunger 31, allows the plunger 31 to move forward. The lug 32 thereupon strikes the lug 43 driving it against its stop 46, and as the plunger 31 continues its forward travel the contact arm 40 is caused to pivot on its fulcrum 41 until it is forced between, and gripped firmly by, the spring jaws 36, 37. The switch is then closed and since the jaws 36, 37 are connected across the detector resistance 1, this resistance becomes shorted out. The result is a decrease in the resistance of the circuit as a whole and this will cause the pointer 21 to move positively across the scale 26. In so doing it touches the contact member 25 thus closing the circuit of the alarm bell 27 which is also provided with locking means. The scale 26 of the ammeter 18 is calibrated at $a'$, $b'$, $c'$ to show the first, second and third points of entry at distances within the range of the pointer 21 corresponding to decreases in the circuit resistance according as to whether detector resistance 1, 2, or 3 is shorted out, and a glance at the meter will therefore indicate the exact point at which an entry is being made.

It will be appreciated that even if the point of entry is immediately closed again the alarm will still continue to function without interruption for as the plunger 31 is forced backward against the spring 34, the lug 43 under the control of its spring 44 will merely ride over the lug 32 and the contact arm 40 will not become disengaged from the spring jaws 36, 37.

If a point of entry is not forced and yet one of the shunt resistances is broken the deviation caused on the ammeter will be sufficient to set the alarm off.

Moreover, if one of the detector resistances is bridged over by an added resistance introduced by a burglar desiring to put the alarm out of commission, sufficient deviation of the pointer or moving element to close the signal circuit, will almost certainly be caused.

It will now be understood that if the bell is ringing the householder will know that an attempt to force an entry from outside is being made and the meter will show at once which point is being tampered with. If, on the other hand, the buzzer is heard, the circuit is being tampered with from the inside of the building.

Once the alarm has been operated it will be necessary for the householder to reset whichever switch has been actuated. This is effected by means of a key which can be screwed into the annulus 56 so as to force down the bridge piece 50. Since the rod 49 connects the bridge piece 50 to the contact arm 40 at a point below its pivot 41, the contact arm 40 will thus be drawn out of and away from the jaws 36, 37. It will be understood that unless the burglar has provided himself with a key which exactly fits the pitch of the annulus 56 it will be impossible for him to reset the switch by means of any other tool.

It may also be necessary to set the switches by means of the key when locking up the building for the night since the switches will have been actuated whenever the points of entry which operate them have been opened in authorised fashion during the day.

Various modifications may be made in the burglar-alarm described without departing from the scope of the invention. For example, the detector resistance may consist of metallic paint applied as a continuous strip or path across the shop window or the like to be protected and with a shunt resistance connected in a concealed position across the ends of the strip or path. In this case, should the window be broken the alarm will be set off.

I claim:

1. An electric burglar alarm for use in a building in which there are several points of entrance thereto comprising, in an electrical circuit, a separate and different electrical resistance (hereinafter called a detector resistance) at each of the respective points of possible entry to said building which it is desired to protect; a shunt resistance connected in parallel with each such detector resistance; separate switch means for each detector resistance, said switch means being operable when the point of entry with which it is associated is opened and, when operated, adapted to short out its detector resistance and with it its shunt resistance; a source of electric current; and a meter having a moving pointer; said pointer being associated, on the one hand, with a scale calibrated to show the respective points of possible entry at positions within the range of the pointer corresponding to the magnitude of the respective pairs of detector and shunt resistances and, on the other hand, with fixed contact means which is connected into a signal circuit.

2. An electric burglar alarm, as claimed in claim 1, in which the contact means is contactable by the moving pointer to close the signal circuit whenever a predetermined limit of deviation of said pointer is exceeded.

3. An electric burglar alarm, as claimed in claim 1, in which the switch means, when operated, is adapted to remain locked on (notwithstanding that the point of entry may be subsequently closed) to short out, and keep shorted out, its detector resistance and with it its shunt resistance.

GERARD MICHAEL HORVITCH.

REFERENCES CITED

The following references are of record in the file of this patent:

UNITED STATES PATENTS

| Number | Name | Date |
| --- | --- | --- |
| 492,478 | Sturts | Feb. 28, 1893 |
| 1,238,823 | Roeder | Sept. 4, 1917 |
| 1,729,137 | Stalmach | Sept. 24, 1919 |
| 976,645 | Field | Nov. 22, 1910 |
| 1,244,332 | Hughs et al. | Oct. 23, 1917 |